(12) United States Patent
Hotta et al.

(10) Patent No.: US 9,985,300 B2
(45) Date of Patent: May 29, 2018

(54) INSULATOR AND FUEL CELL DEVICE

(71) Applicant: TOYOTA JIDOSHA KABUSHIKI KAISHA, Toyota-shi, Aichi-ken (JP)

(72) Inventors: Yutaka Hotta, Toyota (JP); Hiroaki Nishiumi, Toyota (JP); Tateki Takayama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 188 days.

(21) Appl. No.: 14/923,739

(22) Filed: Oct. 27, 2015

(65) Prior Publication Data

US 2016/0126563 A1    May 5, 2016

(30) Foreign Application Priority Data

Nov. 5, 2014   (JP) .................... 2014-224797

(51) Int. Cl.
| | |
|---|---|
| *H01M 8/02* | (2016.01) |
| *H01M 8/24* | (2016.01) |
| *H01M 8/0202* | (2016.01) |
| *H01M 8/2418* | (2016.01) |
| *H01M 8/1018* | (2016.01) |

(52) U.S. Cl.
CPC ....... *H01M 8/0202* (2013.01); *H01M 8/2418* (2016.02); *H01M 2008/1095* (2013.01); *H01M 2250/20* (2013.01); *Y02T 90/32* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,687,717 | A | * | 8/1987 | Kaun ................ | H01M 10/399 429/152 |
| 5,162,172 | A | * | 11/1992 | Kaun ................ | H01M 2/08 429/155 |
| 6,329,093 | B1 | * | 12/2001 | Ohara .............. | H01M 8/0247 429/437 |

(Continued)

FOREIGN PATENT DOCUMENTS

| | | |
|---|---|---|
| JP | 59-27470 | 2/1984 |
| JP | 2007-207555 | 8/2007 |

*Primary Examiner* — Kaity Chandler
(74) *Attorney, Agent, or Firm* — Finnegan, Henderson, Farabow, Garrett & Dunner, LLP

(57) ABSTRACT

In order to prevent a reduction in workability when inserting an insulator, the insulator is to be disposed between a stacked body having a cell stack including a plurality of stacked unit cells and an end member to be disposed outward from the cell stack in stacking directions of the plurality of unit cells, and a covering to be disposed so as to separate in a perpendicular direction to the stacking directions from a side face of the stacked body parallel to the stacking directions. In a state where an end portion of the end member in the perpendicular direction is closer to the covering than an end portion of the cell stack in the perpendicular direction, and the insulator is disposed between the stacked body and the covering, the insulator includes a planar portion for covering at least a part of the side face, and a protruded portion disposed in the planar portion and protruded toward one or more unit cells near the end member among the plurality of unit cells constituting the cell stack.

14 Claims, 4 Drawing Sheets

(56) References Cited

U.S. PATENT DOCUMENTS

| | | | | |
|---|---|---|---|---|
| 2003/0082429 A1* | 5/2003 | Nishimura | .......... | H01M 4/8605 |
| | | | | 429/414 |
| 2004/0043270 A1* | 3/2004 | Tsunoda | .............. | H01M 8/0247 |
| | | | | 429/454 |
| 2004/0053108 A1* | 3/2004 | Tsunoda | .............. | H01M 8/0247 |
| | | | | 429/505 |
| 2006/0208700 A1* | 9/2006 | Kim | .................... | H01M 2/0262 |
| | | | | 320/128 |
| 2007/0148503 A1* | 6/2007 | Okazaki | ............ | H01M 8/04029 |
| | | | | 429/438 |
| 2007/0178345 A1* | 8/2007 | Takeda | .............. | H01M 8/04007 |
| | | | | 429/430 |
| 2008/0118803 A1* | 5/2008 | Dekker | ............... | H01M 8/0228 |
| | | | | 429/457 |
| 2009/0004533 A1* | 1/2009 | Tanaka | ................ | H01M 8/2475 |
| | | | | 429/481 |
| 2009/0068516 A1* | 3/2009 | Kawai | ............... | H01M 8/04067 |
| | | | | 429/442 |
| 2009/0087720 A1* | 4/2009 | Okabe | .................... | H01M 8/248 |
| | | | | 429/454 |
| 2009/0162728 A1* | 6/2009 | Inagaki | ................ | H01M 8/248 |
| | | | | 429/512 |
| 2009/0291344 A1* | 11/2009 | Tanaka | ................ | H01M 8/0228 |
| | | | | 429/460 |
| 2009/0311571 A1* | 12/2009 | Takahashi | ............ | H01M 8/1002 |
| | | | | 429/434 |
| 2012/0264032 A1* | 10/2012 | Watanabe | ............. | H01M 8/242 |
| | | | | 429/467 |
| 2013/0177827 A1* | 7/2013 | Okabe | ................ | H01M 8/0258 |
| | | | | 429/434 |
| 2016/0116539 A1* | 4/2016 | Shiokawa | ......... | H01M 8/04559 |
| | | | | 324/426 |

\* cited by examiner

INSULATOR AND FUEL CELL DEVICE

CROSS-REFERENCE TO RELATED APPLICATIONS

This application claims priority to Japanese Patent Application No. 2014-224797, filed on Nov. 5, 2014, the contents of all of which are incorporated herein by reference in their entirety.

BACKGROUND

The present invention relates to an insulator used for a fuel cell.

In a fuel cell, an insulator may be used in order to electrically insulate between a stacked body including a plurality of stacked unit cells and a member disposed near the stacked body. For example, in a fuel cell disclosed in JP2007-207555A, an insulator is disposed between a stacked body and a tension plate. Generally, since the stacked body of the fuel cell is accommodated in a stack case, the insulator may be disposed between the stacked body and the stack case.

The stacked body may be provided with end members, such as end unit cells and current collectors, at ends in stacking directions. Since the end members have different structures from the unit cells, the contour dimensions of the end members may be larger than contour dimensions of the unit cells. Meanwhile, as a method of assembling a fuel cell device, it can be assumed that the stacked body is placed inside the stack case, sheet-like insulators are then placed so as to cover the sides of the stacked body, coverings are then placed over openings which are formed in the stack case. Further, as for the placement of the insulator described above, it is assumed that one end portion of the insulator is first inserted into a gap which is formed at an end portion of the stack case, and the side of the stacked body is then covered with the insulator. The gap into which the insulator is inserted may be formed in an end portion of a cap-like member fitted into the stack case. However, if contour dimensions of the end member are larger than the contour dimensions of the unit cell, a tip-end portion of the insulator bumps against the end member when the insulator is inserted into the gap described above, thereby causing possible deteriorations in the insertability of the insulator and the assembability of the fuel cell device. Thus, techniques which can prevent the reduction in the workability when assembling the insulator to the fuel cell device are desired. Such a subject is common to various kinds of fuel cell devices in which an insulator is disposed between a stacked body and an arbitrary covering which is disposed separated from the side of the stacked body in a direction perpendicular to the stacking direction, without limiting to the covering which covers the opening formed in the stack case.

SUMMARY

The present invention is made in order to address at least a part of the subject described above, and can be implemented in terms of the following aspects.

(1) According to one aspect of the invention, an insulator is provided. The insulator is to be disposed between a stacked body having a cell stack including a plurality of stacked unit cells and an end member to be disposed outward from the cell stack in stacking directions of the plurality of unit cells, and a covering to be disposed so as to separate in a perpendicular direction to the stacking directions from a side face of the stacked body parallel to the stacking directions. The insulator includes, in a state where an end portion of the end member in the perpendicular direction is closer to the covering than an end portion of the cell stack in the perpendicular direction, and the insulator is disposed between the stacked body and the covering, a planar portion for covering at least a part of the side face, and a protruded portion disposed in the planar portion and protruded toward one or more unit cells near the end member among the plurality of unit cells constituting the cell stack. According to the insulator of this aspect, since the end portion of the end member in the perpendicular direction is closer to the covering than the end portion of the cell stack in the perpendicular direction, the end portion of the end member in the perpendicular direction may interfere with the insulator when inserting the insulator. However, since the protruded portion that protrudes toward one or more unit cells near the end member is provided, the protruded portion contacts the cell stack when inserting the insulator into a gap between the end member and the stack case at the time of assembling a fuel cell device. Thus, it is prevented that a tip-end portion of the insulator in the inserting direction bumps against the end member, thereby preventing the deterioration in the insertability of the insulator. Therefore, it can be prevented that the assembability of the fuel cell device is deteriorated.

(2) In the insulator of the aspect described above, the protruded portion may have a plurality of convex portions. In a state where the insulator is disposed between the stacked body and the covering, at least two of the plurality of convex portions may be arrayed in the planar portion in line in a direction intersecting with the stacking directions. According to the insulator of this aspect, an inclination of the insulator in a direction perpendicular to the inserting direction can be reduced when inserting the insulator, compared with a structure in which only one convex portion is provided. In addition, the inclination of the insulator in the direction perpendicular to the inserting direction can be reduced when inserting the insulator, compared with a structure in which a plurality of convex portions are arrayed parallel to the inserting direction. Thus, the insertability of the insulator improves and it can be prevented that the assembability of the fuel cell device is deteriorated.

(3) In the insulator of the aspect described above, the protruded portion may have the convex portions, and a plan-view shape of each of the convex portions may be a circle. According to the insulator of this aspect, a generation of wrinkles at the time of fabricating the insulator can be prevented because the plan-view shape of the convex portion is a circle.

(4) In the insulator of the aspect described above, the protruded portion may be formed integrally with the planar portion. According to the insulator of this aspect, since the protruded portion is formed integrally with the planar portion, a manufacturing process can be simplified, thereby a reduction in a manufacturing speed and an increase in manufacturing cost are prevented.

(5) In the insulator of the aspect described above, the protruded portion may be formed separately from the planar portion. According to the insulator of this aspect, since the protruded portion is formed separately from the planar portion, the protruded portion can be formed by simple methods, such as adhering the protruded portion to the planar portion using a double-sided tape, adhesive, etc.

(6) According to another aspect of the invention, a fuel cell device is provided. The fuel cell device includes a stacked body having a cell stack including a plurality of stacked unit cells and an end member disposed outward from the cell stack in stacking directions of the plurality of unit cells, a covering disposed so as to separate in a perpendicular direction to the stacking directions from a side face of the stacked body parallel to the stacking directions, and an insulator disposed between the stacked body and the covering. An end portion of the end member in the perpendicular direction is closer to the covering than an end portion of the cell stack in the perpendicular direction. The insulator includes a planar portion covering at least a part of the side face, and a protruded portion disposed in the planar portion and protruded toward one or more unit cells near the end member among the plurality of unit cells constituting the cell stack. According to the fuel cell device of this aspect, since the end portion of the end member in the perpendicular direction is closer to the covering than the end portion of the cell stack in the perpendicular direction, the end portion of the end member in the perpendicular direction may interfere with the insulator when inserting the insulator. However, since the protruded portion that protrudes toward one or more unit cells near the end member is provided to the insulator, the protruded portion contacts the cell stack when inserting the insulator into a gap between the end member and the stack case at the time of assembling the fuel cell device. Thus, it is prevented that a tip-end portion of the insulator in the inserting direction bumps against the end member, thereby preventing the deterioration in the insertability of the insulator. Therefore, it can be prevented that the assemblability of the fuel cell device is deteriorated.

(7) In the fuel cell device of the aspect described above, the fuel cell device may further include a stack case accommodating the stacked body therein. An opening may be formed in the stack case, and the opening may be covered with the covering. According to the fuel cell device of this aspect, in a case where a fuel cell is inserted from the opening of the stack case, and the opening is then closed by the covering after the insulator is placed, the reduction in the workability of a placement of the insulator can be prevented.

(8) In the fuel cell device of the aspect described above, the end member may include either one of a current collector and an end unit cell. According to the fuel cell device of this aspect, since the end portion of either one of the current collector and the end unit cell in the perpendicular direction is closer to the covering than the end portion of the cell stack in the perpendicular direction, the deterioration in the insertability of the insulator can be prevented by the protruded portion although the end portion may interfere with the insulator when inserting the insulator.

The present invention can also be implemented in other various forms. For example, the invention can be implemented in forms, such as a fuel cell system provided with the fuel cell device, a vehicle to which the fuel cell system is mounted, a method of manufacturing the insulator, and a method of manufacturing the fuel cell device.

DESCRIPTION OF THE EMBODIMENTS

A. Embodiment

A-1. Structure of Fuel Cell Device

Figure 1:
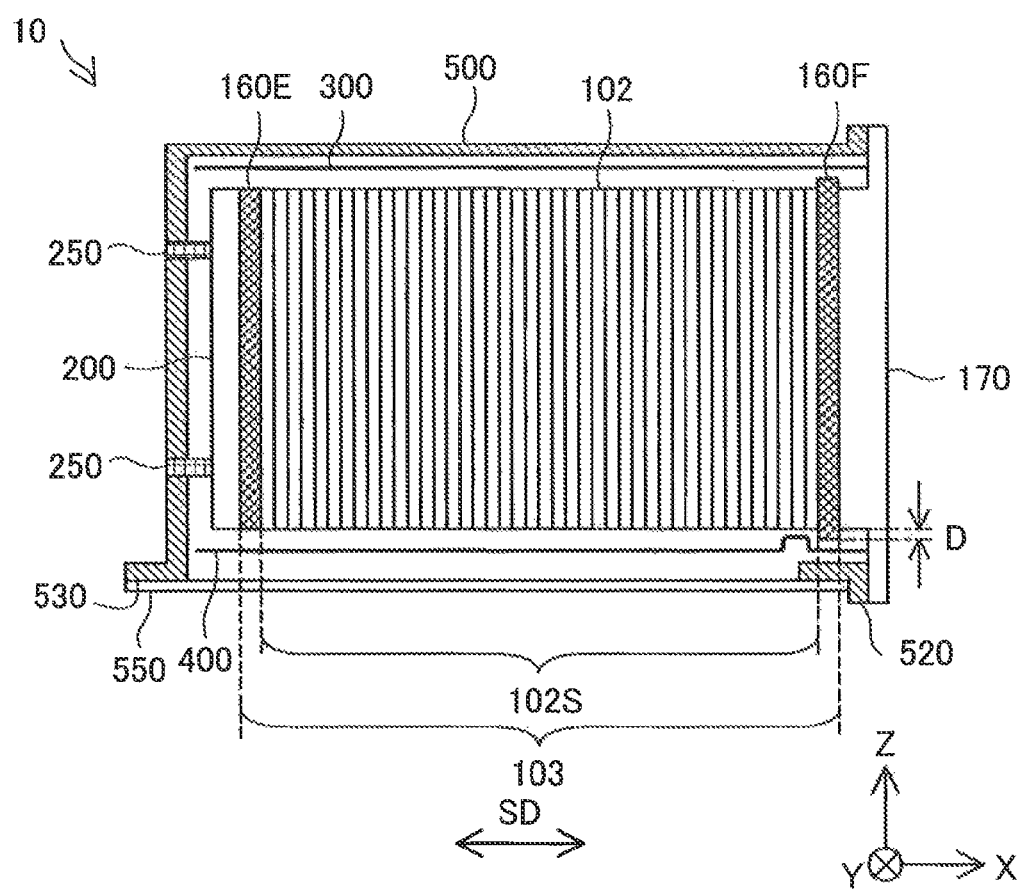
FIG. 1 is a cross-sectional view schematically illustrating a structure of a fuel cell to which an insulator as one embodiment of the present invention is applied.

FIG. 1 is a cross-sectional view schematically illustrating a structure of a fuel cell device to which an insulator as one embodiment of the present invention is applied. The fuel cell device 10 has a so-called polymer electrolyte fuel cell (PEFC), and constitutes a fuel cell system together with a supply part of reactive gases (fuel gas and oxidizing gas), a supply part of cooling medium, etc. For example, such a fuel cell system is used as a system for supplying drive power, and is mounted on an electric vehicle, etc.

The fuel cell device 10 includes a cell stack 102S, a first current collector 160E, a second current collector 160F, an end plate 170, a pressure plate 200, a first insulator 300, a second insulator 400, a stack case 500, and a covering 550.

The cell stack 102S has a structure in which a plurality of unit cells 102 are stacked in stacking directions SD. Each unit cell 102 is including a membrane electrode assembly, a pair of gas diffusion layers which sandwich the membrane electrode assembly therebetween, and a pair of separators which sandwich the stacked body including the membrane electrode assembly and the gas diffusion layers. Note that in this embodiment, X-axis is defined as a direction parallel to the stacking directions SD of the unit cells 102 or the horizontal directions. Note that in this embodiment, Y-axis is defined as a direction parallel to long-side directions of each unit cell 102, and Z-axis is defined as a direction parallel to the short-side direction. Y-axis and Z-axis are both perpendicular to X-axis. +Z direction corresponds to a vertically upward direction, and −Z direction corresponds to a vertically downward direction.

The first current collector 160E is disposed in contact with an end face of the cell stack 102S in −X direction. In this embodiment, the first current collector 160E is made of aluminum. The second current collector 160F is disposed in contact with an end face of the cell stack 102S in +X direction. A stacked body 103 including the cell stack 102S, the first current collector 160E, and the second current collector 160F corresponds to a so-called fuel cell. In this embodiment, the second current collector 160F has a three-layer structure of titanium layer, an aluminum layer, titanium layer, and an outer edge thereof is covered with rubber. Thus, contour dimensions of the second current collector 160F are larger than contour dimensions of the unit cells 102. Therefore, a position of the second current collector 160F in a direction perpendicular to the stacking directions SD (i.e., −Z direction) is closer to the covering 550 than a position in the side face of the cell stack 102S in −Z direction. Thus, in a finished state (i.e., as a finished product) of the fuel cell device 10, a step exists in the direction perpendicular to the stacking directions SD between the second current collector 160F and the cell stack 102S. FIG. 1 illustrates a step D in −Z direction. In this embodiment, although the height of the step D is 3 mm, it may be any height. The first current collector 160E and the second current collector 160F collect generated power from each unit cell 102, and output the collected power to exterior from terminals. Note that the first current collector 160E may be formed in a three-layer structure, similar to the second current collector 160F. Note that the two current collectors 160E and 160F may be made of materials other than aluminum and titanium.

The end plate 170 is disposed outward of the second current collector 160F in the stacking directions SD. Inside the end plate 170, flow paths for supplying the reactive gas and cooling medium to the cell stack 102S and flow paths for discharging the reactive gas and cooling medium from the cell stack 102S are formed. A step is formed in an edge portion of a surface of the end plate 170 in −X direction, and an end portion of the stack case 500 in +X direction is in contact with a thinned portion of the end plate 170. In this embodiment, the end plate 170 is made of resin material to have a high insulation performance.

The pressure plate 200 is disposed outward of the first current collector 160E in the stacking directions SD. Note that an insulator is disposed between the pressure plate 200 and the first current collector 160E. The pressure plate 200 maintains the stacked state of the cell stack 102S together with the end plate 170 by being fixed with a plurality of threaded members 250 inserted from tapped holes formed in the stack case 500, and pressing the cell stack 102S.

Surfaces perpendicular to the stacking directions SD of the unit cells 102, the first current collector 160E, the second current collector 160F, and the pressure plate 200 have substantially rectangular shapes, and they are oriented so that their long sides are parallel to Y-axis.

The first insulator 300 is disposed above in vertical directions from the stacked body 103, the pressure plate 200, and a part of the end plate 170 (thick portion), and covers +Z direction side faces of these components. The first insulator 300 electrically insulates the stacked body 103 and the pressure plate 200 from the stack case 500.

The second insulator 400 is disposed below in vertical directions from the stacked body 103, the pressure plate 200, and a part of the end plate 170 (thick portion), and covers −Z direction side faces of these components. The second insulator 400 electrically insulates the stacked body 103 and the pressure plate 200 from a stack case bridging part 520 and the covering 550.

In this embodiment, the first insulator 300 and the second insulator 400 are a sheet-like member having a 0.3-mm thickness, and are made of polyethylene terephthalate (PET). Note that the first insulator 300 and the second insulator 400 may also have any thicknesses other than 0.3 mm. The first insulator 300 and the second insulator 400 may be made of any other materials, instead of PET, which have the insulation capabilities, such as polyethylene naphthalate (PEN) and polyether ether ketone (PEEK). Note that the first insulator 300 and the second insulator 400 may have mutually different thicknesses, and may be made of mutually different materials.

Figure 2:
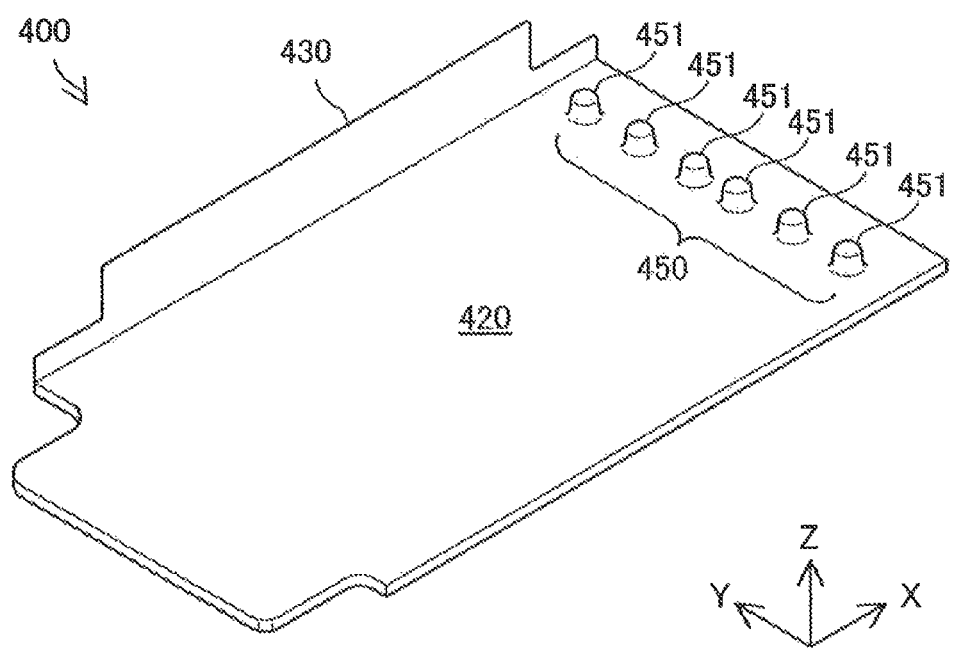
FIG. 2 is a perspective view schematically illustrating a structure of the second insulator.

FIG. 2 is a perspective view schematically illustrating a structure of the second insulator 400. The second insulator 400 is provided with a planar portion 420, a side face portion 430, and a protruded portion 450. The planar portion 420 has a contour shape and a contour size which can entirely cover −Z direction side faces of the stacked body 103, the pressure plate 200, and a part of the end plate 170. The side face portion 430 is formed so as to project substantially in +Z direction from an outer edge of the planar portion 420 in +Y direction, and electrically insulates a part of +Y direction side face of the stacked body 103 from a side face of the stack case 500.

The protruded portion 450 is disposed at an end portion of the planar portion 420 in +X direction, and is formed so as to protrude in +Z direction from the planar portion 420. In the finished state of the fuel cell device 10 illustrated in FIG. 1, the protruded portion 450 protrudes toward some of the unit cells 102 which constitute the cell stack 102S, which are near the second current collector 160F. Note that in this embodiment, the "unit cells 102 near the second current collector 160F" as described above refers to, among the plurality of unit cells 102 which constitute the cell stack 102S, some of the unit cells 102 located on the second current collector 160F side (in +X direction) from the center of the cell stack 102S in the stacking directions SD. Preferably, it refers to at least some of the first to 20th unit cells 102 when counting from the unit cell 102 in contact with the second current collector 160F. The protruded portion 450 prevents a reduction in workability at the time of assembling the second insulator 400. Note that detailed operation of the protruded portion 450 will be described later.

In this embodiment, the protruded portion 450 is including six convex portions 451. Each convex portion 451 has a substantially cylindrical contour shape which is gradually tapered in +Z direction, and of which a plan-view shape is circular. Each convex portion 451 may be solid or hollow. Note that in this embodiment, an area of an end face of each convex portion 451 in +Z direction is 1 cm$^2$, and a height in +Z direction is 5 mm. The six convex portions 451 are arrayed in line parallel to Y-axis. The six convex portions 451 are disposed at a substantially equal interval. Note that in this embodiment, an interval between two central convex portions 451 is slightly narrower than the interval of other convex portions 451. However, the six convex portions 451 may be arrayed at an exactly equal interval. In this embodiment, the protruded portion 450 (convex portions 451) is fabricated integrally with the planar portion 420 by hot pressing. Note that, instead of hot pressing, the protruded portion 450 may be fabricated by any other forming methods, such as compression vacuum forming.

The stack case 500 illustrated in FIG. 1 has a substantially rectangular parallelepiped contour shape, and accommodates the stacked body 103 therein. Openings are formed in side faces of the stack case 500 in +X direction and −Z direction. The opening in +X direction side face is closed by the end plate 170. The opening in −Z direction side face is closed by the covering 550. The stack case bridging part 520 is formed in an outer edge portion in +X direction in the side face of the stack case 500 in −Z direction. The stack case bridging part 520 supports the covering 550, together with an end portion 530 located in −X direction of the opening formed in the side face of the stack case 500 in −Z direction. The plurality of tapped holes for inserting the threaded members 250 described above are formed in the side face of the stack case 500 in −X direction. Note that other side surfaces of the stack case 500 (a side surface in +Y direction, a side surface in −Y direction, and a side face in +Z direction) have plate-like external shapes. In this embodiment, the stack case 500 is formed by die casting and made of aluminum. Instead of aluminum, the stack case 500 may be made of any other metals, such as steel.

The covering 550 is disposed vertically below the second insulator 400, and covers the opening in the side face of the stack case 500 in −Z direction. The covering 550 has a substantially rectangular shape and has a size substantially equal to the side face of the stack case 500 in −Z direction. In this embodiment, although the covering 550 is made of iron, it may be made of any other metals, such as steel, instead of iron.

In this embodiment, the second insulator 400 corresponds to an "insulator." The second current collector 160F corresponds to an "end member." The stacked body 103 corresponds to a "stacked body."

A-2. Assembly of Fuel Cell Device

Figure 3:
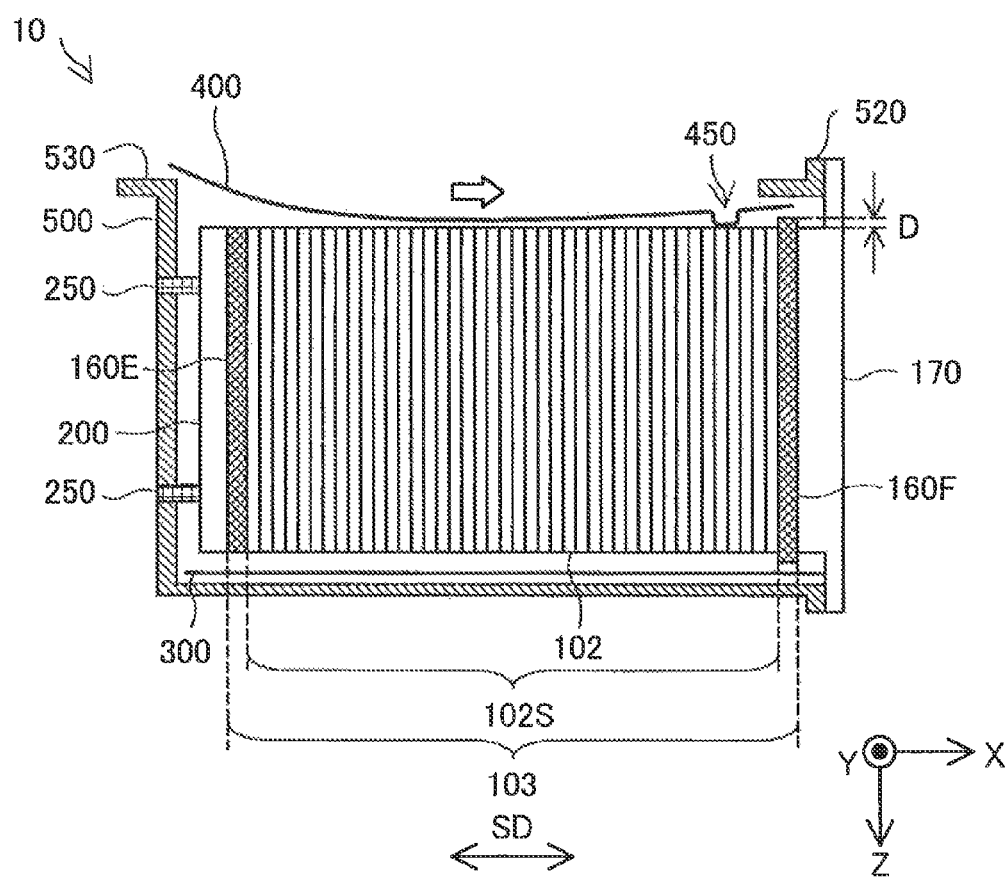
FIG. 3 is a cross-sectional view schematically illustrating a part of assembling process of a fuel cell device.

FIG. 3 is a cross-sectional view schematically illustrating a part of assembling process of the fuel cell device 10. More specifically, a structure of the fuel cell device 10 in the middle of insertion of the second insulator 400 is illustrated. A white arrow in this drawing indicates an inserting direction of the second insulator 400. The fuel cell device 10 is assembled in a state where it is vertically inverted or upside down from the state illustrated in FIG. 1. Thus, in FIG. 3, the first insulator 300 is located vertically below, and the second insulator 400 is located vertically above the stacked body 103.

In FIG. 3, a state after the first insulator 300, the stacked body 103, and the pressure plate 200 are disposed inside the stack case 500, the end plate 170 is disposed so as to cover the opening of the stack case 500, and threaded members 250 are inserted into the tapped holes formed in the side face of the stack case 500 in −X direction, is illustrated.

In a placing process of the second insulator 400, the second insulator 400 is first disposed at a position offset in −X direction from a predetermined position illustrated in FIG. 1. Here, an end portion of the second insulator 400 in +X direction is located away from the second current collector 160F in −X direction. The second insulator 400 is oriented so that the protruded portion 450 protrudes toward the cell stack 102S. The second insulator 400 is placed so that an end portion near the protruded portion 450 among the end portions in the longitudinal directions of the planar portion 420 is located at the end in +X direction. Next, the entire second insulator 400 is slid in +X direction, and the end portion of the second insulator 400 in +X direction is inserted into a gap between the second current collector 160F and the stack case bridging part 520. Note that, hereinafter, +X direction is also referred to as "the inserting direction." Here, as illustrated in FIG. 3, the second insulator 400 becomes in a state where it is entirely bent or curved, and the protruded portion 450 contacts the cell stack 102S. Thus, a tip-end portion of the second insulator 400 in the inserting direction is located 5 mm above a contacting position of the protruded portion 450 with the cell stack 102S, and thereby the tip-end portion can easily climb over the step D of 3-mm high. Further, since the plurality of convex portions 451 which constitute the protruded portion 450 are arrayed in a direction (Y-axis direction) perpendicular to the inserting direction, the planar portion 420 can be maintained substantially parallel to the side face of the cell stack 102S in −Z direction when the second insulator 400 is entirely slid in +X direction. In other words, an inclination of the second insulator 400 in the direction perpendicular to the inserting direction can be reduced. Thus, the bumping of the tip-end portion of the second insulator 400 in the inserting direction against the second current collector 160F due to the inclination of the second insulator 400 can be prevented. Further, damages to the side face of the cell stack 102S due to the contact of the end portion of the second insulator 400 in +Y direction or the end portion of the second insulator 400 in −Y direction to the side face of the cell stack 102S in −Z direction can be reduced.

When the tip-end portion of the second insulator 400 is inserted into the gap between the second current collector 160F and the stack case bridging part 520, the planar portion 420 covers the side face of the cell stack 102S. Then, the covering 550 is placed, and thereby the assembly of the fuel cell device 10 is completed.

According to the second insulator 400 of this embodiment described above, the second insulator 400 is provided with the protruded portion 450 which protrudes toward the cell stack 102S. Thus, upon the assembly of the fuel cell device 10, when the end portion of the second insulator 400 is inserted into the gap between the second current collector 160F and the stack case bridging part 520, the tip-end portion of the second insulator 400 in the inserting direction can easily climb over the step D because the protruded portion 450 contacts the cell stack 102S. Thus, it is prevented that the tip-end portion of the second insulator 400 bumps against the second current collector 160F, thereby preventing the deterioration in the insertability of the second insulator 400. Therefore, the deterioration in the assembability of the fuel cell device 10 can be prevented.

Further, since the protruded portion 450 is provided with the six convex portions 451, and the six convex portions 451 are arrayed in line in the direction parallel to Y-axis, the inclination of the second insulator 400 in the direction perpendicular to the inserting direction can be reduced, compared with a structure in which only one convex portion 451 is provided. Further, the inclination of the second insulator 400 in the direction perpendicular to the inserting direction can be reduced, compared with a structure in which a plurality of convex portions 451 are arrayed parallel to the inserting direction. Therefore, the insertability of the second insulator 400 improves, the deterioration in the assembability of the fuel cell device 10 can be prevented, and the damages to the side face of the cell stack 102S in −Z direction can be prevent by the second insulator 400.

Further, since the plan-view shape of each of the six convex portions 451 is a circular shape, a generation of wrinkles at the time of fabrication of the second insulator 400 can be prevented. Further, since the six convex portions 451 are arrayed at a substantially equal interval, the generation of wrinkles at the time of fabrication of the second insulator 400 can be prevented, compared with a structure in which six convex portions 451 are arrayed at random intervals. Further, since the interval between the two central convex portions 451 is slightly narrower than the interval of other convex portions 451, the generation of wrinkles at the time of fabrication of the second insulator 400 can be prevented, compared with a structure in which six convex portions 451 are arrayed at an exactly equal interval. Further, since the protruded portion 450 (convex portions 451) is formed integrally with the planar portion 420 by hot pressing, the manufacturing process of the second insulator 400 can be simplified, thereby preventing a reduction in manufacturing speed and an increase in the manufacturing cost.

B. Comparative Example

Figure 4:
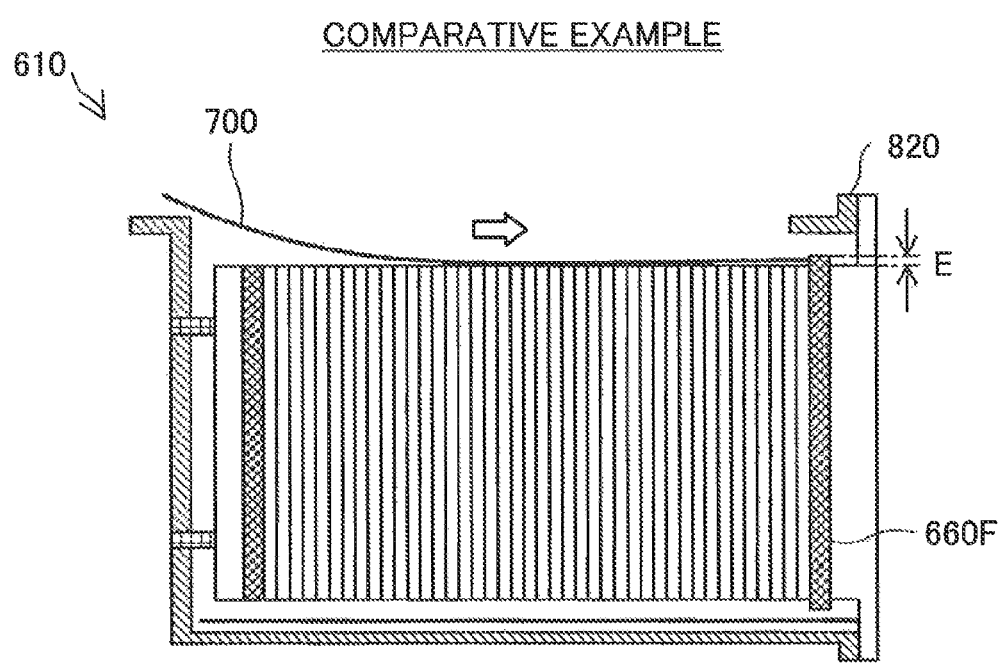
FIG. 4 is a cross-sectional view schematically illustrating a part of assembling process of a fuel cell device in a comparative example.

FIG. 4 is a cross-sectional view schematically illustrating a part of an assembling process of a fuel cell device in a comparative example. FIG. 4 illustrates a structure of a fuel cell device 610 in the middle of an insertion of an insulator 700. A white arrow in the drawing indicates an inserting direction of the insulator 700. The insulator 700 of the comparative example is not provided with a protruded portion. As illustrated in FIG. 4, the insulator 700 hangs down with gravity because it is a sheet-like member, and thereby the insulator 700 becomes in a state where it is entirely bent or curved when inserted. Here, since the insulator 700 is not provided with the protruded portion, a tip-end portion of the insulator 700 in the inserting direction bumps against a current collector 660F, and thereby it cannot climb over a step E as it is. Thus, an insertability of the insulator 700 into a gap between the current collector 660F and a stack case bridging part 820 is deteriorated, and thereby the assembability of the fuel cell device 610 is deteriorated. On the other hand, according to the second insulator 400 in the embodiment described above, since the second insulator 400 is provided with the protruded portion 450, the tip-end portion of the second insulator 400 can easily climb over the step D. Thus, the insertability of the second insulator 400 improves, and the deterioration in the assembability of the fuel cell device 10 can be prevented.

C. Modifications

C-1. Modification 1

In the embodiment described above, although the protruded portion 450 of the second insulator 400 is formed integrally with the planar portion 420, the present invention is not limited to this structure. The protruded portion 450 may be formed separately from the planar portion 420. With this structure, similar effects to the second insulator 400 of the embodiment can still be obtained. In this structure, the protruded portion 450 can be formed by a simple method, for example, members of the convex portions 451 are each formed by injection molding etc., and these members are adhered to the planar portion 420 using double-sided tapes, adhesive.

C-2. Modification 2

Although each convex portion 451 has a substantially cylindrical contour shape with taper and the plan-view shape thereof is circular in the embodiment described above, the present invention is not limited to this structure. The convex portion 451 may have a hemispherical contour shape, or may have any other plan-view shape, such as an ellipse or polygon, instead of the circle. Further, at least some of the six convex portions 451 may have different contour shapes from other convex portions 451. Further, the areas of the +Z direction end faces of the convex portions 451 may be any sizes as long as they can secure the performance of the protruded portion 450. Further, the protruded portion 450 may have any heights, other than 5 mm. However, it is preferred that the height is higher than the height of the step D, and is less than the width of the gap between the second current collector 160F and the stack case bridging part 520, in the assembled state of the fuel cell device 10. Further, at least some of the six convex portions 451 may have different sizes and heights from other convex portions 451. Further, in the embodiment described above, although the six convex portions 451 are arrayed in line at a substantially equal interval, they may be arrayed in any other patterns, for example, they may be arrayed in a plurality of rows or may be arrayed at random intervals. However, in order to reduce the inclination of the second insulator 400, it is preferred that the convex portions 451 are arrayed in patterns, other than arrayed in line in the direction parallel to X-axis. That is, generally, the protruded portion 450 may have the plurality of convex portions 451, and at least two of the plurality of convex portions 451 may be arrayed in line in the planar portion 420 in a direction which intersects with the stacking direction SD.

C-3. Modification 3

In the embodiment described above, although the protruded portion 450 has the six convex portions 451, the number of the convex portions 451 may be any other numbers. However, in order to reduce the inclination of the second insulator 400, it is preferred that the number of the convex portions 451 is two or more. Note that, in a structure in which the number of the convex portions 451 is one, it is preferred that the dimension of the convex portion 451 in a direction parallel to Y-axis is larger in order to reduce the inclination of the second insulator 400. For example, it is preferred that the dimension is ⅓ or more of a length of the planar portion 420 in the direction parallel to Y-axis, and more preferably ½ or more.

C-4. Modification 4

In the embodiment described above, although the openings are formed in the +X direction end face and the −Z direction end face of the stack case 500, the present invention is not limited to this structure. An opening may be formed in the +Z direction end face instead of the −Z direction end face, and this opening may be closed by the covering 550. In this structure, the following method is assumed as a method of assembling the fuel cell device 10. The second insulator 400 is first placed inside the stack case 500, the stacked body 103, the pressure plate 200, and the end plate 170 are then placed, the threaded members 250 are inserted into the tapped holes, the first insulator 300 is then inserted, and the covering 550 is placed. Further, in this structure, it is preferred that the locations of the first insulator 300 and the second insulator 400 are inverted with respect to the embodiment described above. In this inverted structure, the protruded portion 450 is now provided to the first insulator 300 instead of the second insulator 400, the insertability of the first insulator 300 improves, thereby preventing the deterioration of the assembability.

Further, a slit for inserting the second insulator 400 may be formed in the −X direction side face of the stack case 500, instead of forming the opening in the −Z direction side face. In this structure, the −Z direction side face of the stack case 500 has a structure similar to the +Z direction side face of the stack case 500 of the embodiment described above. In this structure, the following method is assumed as a method of assembling the fuel cell device 10. The first insulator 300 is first placed inside the stack case 500, the stacked body 103, the pressure plate 200, and the end plate 170 are then placed, the threaded members 250 are then inserted into the tapped holes, the second insulator 400 is then inserted from the slit formed in the −X direction side face of the stack case 500, and the slit is closed by a covering. In this structure, the side face of the stack case 500 which is opposite to and located vertically below the second insulator 400 corresponds to a "covering."

C-5. Modification 5

In the embodiment described above, in the finished state of the fuel cell device 10, although the step D in Z direction exists between the second current collector 160F and the cell stack 102S, the present invention is not limited to this structure. If contour dimensions of an end unit cell disposed at an end portion in the stacking directions SD of the unit cells 102 which constitute the cell stack 102S are larger than contour dimensions of other unit cells 102, a step exists between the end unit cell and the adjacent unit cell 102. This kind of step may also exist, alternatively or additionally to the step D of the embodiment described above. Also by such a structure, similar effects to the second insulator 400 of the embodiment can still be obtained. In this structure, the end unit cell corresponds to an "end member." That is, generally, the end member includes either the current collector or the end unit cell, and an end portion of the end member in a direction perpendicular to the stacking directions SD may be closer to the covering than the end portion of the cell stack 102S in the direction perpendicular to the stacking directions SD. Note that a member other than the current collector or the end unit cell may be provided as the end member.

C-6. Modification 6

Although the stack case bridging part 520 is formed in the stack case 500 and supports the covering 550 together with the end portion 530 in the embodiment described above, the present invention is not limited to this structure. A convex portion in −X direction formed in the end portion of the end plate 170 may support the covering 550 together with the end portion 530, instead of the stack case bridging part 520. In this structure, the end portion in +X direction of the second insulator 400 is inserted into a gap between the second current collector 160F and the convex portion in −X direction formed in the −Z direction end portion of the end plate 170.

C-7. Modification 7

In the embodiment described above, although the second insulator 400 is provided with the side face portion 430, the second insulator 400 may not be provided with the side face portion 430. Also by this structure, similar effects to the second insulator 400 of the embodiment can still be obtained. Further, although the fuel cell device 10 is provided with the two insulators, the first insulator 300 vertically above the stacked body 103, and the second insulator 400 vertically below the stacked body 103, additional insulators may be provided on other side faces of the cell stack 102S (+Y direction side face and −Y direction side face).

The present invention is not limited to the embodiment and the modifications described above, and can be implemented in various structures without departing from the scope of the invention. For example, technical features in the embodiment and the modifications corresponding to technical features of each aspect cited in the section of "SUMMARY OF THE INVENTION," can suitably be substituted and/or combined in order to address some or all of the subjects described above, or in order to obtain some or all of the effects described above. The technical features can suitably be deleted if they are not described as essential matters in this specification.

What is claimed is:

1. An insulator, to be disposed between a stacked body having a cell stack and a covering, the cell stack including a plurality of stacked unit cells and an end member to be disposed outward from the cell stack in stacking directions of the plurality of unit cells, the covering to be disposed separately in a perpendicular direction to the stacking directions from a side face of the stacked body and parallel to the stacking directions, in a state where an end portion of the end member in the perpendicular direction is closer to the covering than an end portion of the cell stack in the perpendicular direction, the insulator comprising:
   a planar portion for covering at least a part of the side face; and
   a protruded portion disposed in the planar portion and protruded toward one or more unit cells near the end member among the plurality of unit cells constituting the cell stack.

2. The insulator in accordance with claim 1, wherein, the protruded portion has a plurality of convex portions, in a state where the insulator is disposed between the stacked body and the covering, at least two of the plurality of convex portions are arrayed in the planar portion in line in a direction intersecting with the stacking directions.

3. The insulator in accordance with claim 2, wherein a plan-view shape of each of the convex portions is a circle.

4. The insulator in accordance with claim 1, wherein the protruded portion is formed integrally with the planar portion.

5. The insulator in accordance with claim 1, wherein the protruded portion is formed separately from the planar portion.

6. A fuel cell device, comprising:
   a stacked body having a cell stack including a plurality of stacked unit cells and an end member disposed outward from the cell stack in stacking directions of the plurality of unit cells;
   a covering disposed so as to separate in a perpendicular direction to the stacking directions from a side face of the stacked body parallel to the stacking directions; and
   an insulator disposed between the stacked body and the covering,
   wherein an end portion of the end member in the perpendicular direction is closer to the covering than an end portion of the cell stack in the perpendicular direction, and
   wherein the insulator includes:
   a planar portion covering at least a part of the side face; and
   a protruded portion disposed in the planar portion and protruded toward one or more unit cells near the end member among the plurality of unit cells constituting the cell stack.

7. The fuel cell device in accordance with claim 6, further comprising a stack case accommodating the stacked body therein, an opening being formed in the stack case, and the opening being covered with the covering.

8. The fuel cell device in accordance with claim 6, wherein the end member includes either one of a current collector and an end unit cell.

9. The fuel cell device in accordance with claim 6, wherein,
   the protruded portion has a plurality of convex portions,
   in a state where the insulator is disposed between the stacked body and the covering, at least two of the plurality of convex portions are arrayed in the planar portion in line in a direction intersecting with the stacking directions.

10. The fuel cell device in accordance with claim 9, wherein a plan-view shape of each of the convex portions is a circle.

11. The fuel cell device in accordance with claim 6, wherein the protruded portion is formed integrally with the planar portion.

12. The fuel cell device in accordance with claim 6, wherein the protruded portion is formed separately from the planar portion.

13. The insulator in accordance with claim 1, wherein the protruded portion has a convex portion, and a plan-view shape of the convex portion is a circle.

14. The fuel cell device in accordance with claim 6, wherein the protruded portion has a convex portion, and a plan-view shape of the convex portion is a circle.

* * * * *